Patented Oct. 12, 1943

2,331,749

UNITED STATES PATENT OFFICE 2,331,749

AMINE SALT OF A THIODIAZOLE

George W. Watt, Austin, Tex., assignor to Wingfoot Corporation, Wilmington, Del., a corporation of Delaware No Drawing. Application June 29, 1938, Serial No. 216,627

1 Claim. (Cl. 260—302)

This invention relates to a new composition of matter and to a compound useful in the vulcanization of rubber. More particularly, the invention relates to an amine salt of a thiodiazole.

It has been found that the 2-mercapto 4-aryl thiodiazole 5-thiones may be reacted with amines to yield salts of definite chemical composition. The dithiazoles may be exemplified by 2-mercapto 4-phenyl thiodiazole 5-thione having the formula

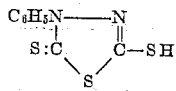

which may be prepared in the form of its salt from phenyl hydrazine carbon disulfide and a hydroxide in the following manner:

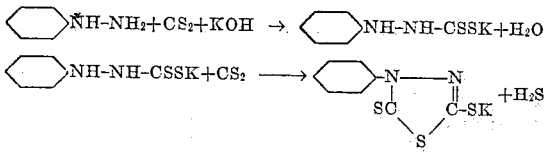

Other thiodiazoles may be prepared in the same manner, such as those in which the phenyl substituent of the foregoing compound has been replaced by tolyl, xylyl, naphthyl, cumyl, and the like.

These amine salts of 2-mercapto 4-aryl thiodiazole 5-thiones have been found useful as activators for accelerators of the vulcanization of rubber and may be used in conjunction with mercaptobenzothiazole and other accelerators commonly used in rubber. The general formula for the class of activators herein described may be represented as follows:

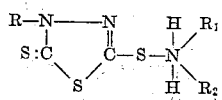

where R is an aryl group and $R_1$ and $R_2$ may be aliphatic, aromatic or heterocyclic groups or hydrogen, not more than one hydrogen being present. Furthermore, $R_1$ and $R_2$ may constitute, conjointly with the imino or nitrogen containing group, a heterocyclic nucleus, such as the piperidyl group. Where guanidine salts are formed, a special case arises under the general formula given above which may be represented by the subgeneric formula:

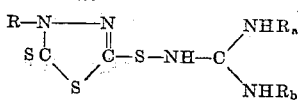

where $R_a$ and $R_b$ are simple or substituted aliphatic, aromatic or heterocyclic groups or hydrogen. It will thus be seen that the mercapto compound may be reacted with compounds of the general formula

in which $R_1$ and $R_2$ are hydrogen, aliphatic or aromatic radicals or, with the imino or NH group, constitute a heterocyclic or a guanidine radical.

Among the various amines with which the 2-mercapto 4-aryl thiodiazole 5-thione may be reacted are cyclohexylamine, benzylamine, piperidine, dicyclohexylamine, dibutylamine, N-ethyl cyclohexylamine, N-butyl cyclohexylamine, N-phenyl cyclohexylamine, dibenzylamine, beta phenyl ethylamine, N-butyl beta phenyl ethylamine, primary butylamine, amylamine, furfurylamine, tetrahydrofurfurylamine, difurfuryl amine, ditetrahydrofurfurylamine and N-cyclohexyl furfurylamine. The guanidines form salts in a similar manner and are included within the term "amine" as used in the appended claims. Among the guanidines found suitable are diphenylguanidine, ditolyl guanidine, dixylyl guanidine, N-phenyl N' cyclohexyl guanidine, N N' dicyclohexyl guanidine, N-methyl cyclohexyl N' tolyl guanidine, N-butyl N' tolyl guanidine, phenyl tolyl guanidine and other similar guanidines.

The amine salts may be readily formed by permitting the thiodiazole to react, preferably in solution, with the selected amine or guanidine. The conditions for the reaction are not critical, room temperature usually being sufficient but the reaction mixture may require to be slightly warmed under reflux or, where heat is evolved, cooling may be necessary. The starting materials will ordinarily react in molecular or equivalent proportions but an excess of either one may be present where this is advisable in order to promote the reaction. The following examples illustrate a method of formation of these compounds, although it will be understood that the invention is not limited thereto.

*Example 1*

The piperidine salt of 2-mercapto 4-phenyl thiodiazole 5-thione was prepared from 15 parts of the mercaptan dissolved in 50 parts of acetone at room temperature and treated with 6.8 parts of piperidine (10% excess). Heat was evolved and a white crystalline solid separated. The mixture was cooled, diluted with 20 parts of petroleum ether, filtered and the solid washed with petroleum ether and air-dried. The yield amounted to 20.5 parts of the piperidine salt in the form of a white crystalline solid, melting point 156–7° C. This corresponds to a theoretical yield. Analysis: Calculated for $C_{13}H_{17}N_3S_3$: S, 30.86. Found: S, 31.16. Hence, the formula is assumed to be

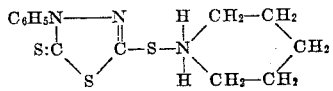

*Example 2*

The cyclohexylamine salt was prepared by dissolving 15 parts of 2-mercapto 4-phenyl thiodiazole 5-thione in 50 parts of acetone at room temperature and treating this with 7.2 parts of cyclohexylamine (10% excess) dissolved in 10 parts of acetone. An exothermic reaction ensued and the reaction mixture was cooled in an ice bath and diluted with ether and petroleum ether to induce crystallization of the cyclo hexylamine salt. Finally, the pale tan crystals which separated were filtered off, washed with petroleum ether and dried. There were thus obtained 19.2 parts of the desired salt, a 90% yield. The melting point was 180–181° C. Analysis: Calculated for $C_{14}H_{19}N_3S_3$: S, 29.53. Found: S, 30.07. Hence, the formula is assumed to be

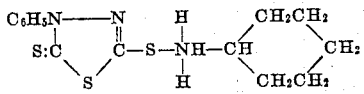

*Example 3*

The benzyl amine salt was prepared from 15 parts of 2-mercapto 4-phenyl thiodiazole 5-thione dissolved in 35 parts of acetone and treated with 7.5 parts of benzyl amine (5% excess). Heat was evolved and the reaction mixture was eventually cooled and diluted with petroleum ether. The pale yellow crystals which separated were filtered off, washed with petroleum ether and dried. The yield of 22 parts was theoretical, the compound having a melting point of 147–8° C. Analysis: Calculated for $C_{15}H_{15}N_3S_3$: S, 28.83. Found, S, 28.74. Hence, the formula is assumed to be

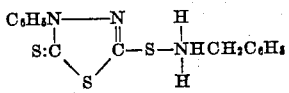

*Example 4*

The dicyclohexylamine salt was formed from 8.4 parts of the mercaptan dissolved in 25 parts of acetone at room temperature and a solution of 7 parts of dicyclohexylamine, a 5% excess, in 15 parts of acetone. Heat was evolved and a crystalline solid separated. The mixture was cooled, diluted with 75 parts of petroleum ether, and the cream-colored crystals filtered off, washed with petroleum ether, and dried. A yield of 13 parts, or 86% of the theoretical, was obtained of a compound melting at 214–6° C. with decomposition. Analysis: Calculated for $C_{20}H_{29}N_3S_3$: S, 23.59. Found, S, 23.58. Hence, the formula is assumed to be

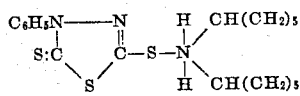

*Example 5*

The sym. diphenylguanidine salt of 2-mercapto 4-phenyl thiodiazole 5-thione was prepared as follows: Fifteen parts of the mercaptan and 14 parts of sym. diphenylguanidine were warmed under reflux in 100 parts of alcohol for one hour. The reaction mixture was concentrated to a volume of 75 parts, diluted with water until a permanent turbidity developed and cooled in the ice bath. A heavy amber oil separated and crystallized upon further standing. The solid was broken up, filtered off, and dried. A yield of 26 parts, or 90% of the theoretical, was obtained of a solid melting at 120–123° C. The formula of this product is assumed to be

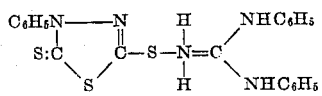

Other salts may be prepared, in a manner similar to that set forth in the foregoing examples, from the various 2-mercapto 4-aryl thiodiazole 5-thiones and the various amines, including the guanidines mentioned herein.

Certain of the compounds were tested in rubber to determine their activating power. A test stock was selected consisting of

|  | Parts |
|---|---|
| Smoked sheet | 100.00 |
| Zinc oxide | 5.00 |
| Sulfur | 3.00 |
| Mercaptobenzothiazole | 0.30 |
| Activator | 0.20 |

The various salts were added to the stock in the amount indicated, these salts being identified as follows:

| No. | Name |
|---|---|
| 1 | Piperidine salt of 2-mercapto 4-phenyl thiodiazole 5-thione. |
| 2 | Cyclohexylamine salt of 2-mercapto 4-phenyl thiodiazole 5-thione. |
| 3 | Benzylamine salt of 2-mercapto 4-phenyl thiodiazole 5-thione. |
| 4 | Dicyclohexylamine salt of 2-mercapto 4-phenyl thiodiazole 5-thione. |
| 5 | Sym. diphenylguanidine salt of 2-mercapto 4-phenyl thiodiazole 5-thione. |

The results obtained as a result of testing these stocks after cure are shown below:

| No. | Cure mins. at °F. | Tensile break | Ult. elong. | Modulus at— | |
|---|---|---|---|---|---|
|  |  |  |  | 500% | 700% |
|  |  | $kgs./cm.^2$ |  |  |  |
| 1 | 20/260 | 145 | 760 | 28 | 101 |
| 2 | 20/260 | 155 | 770 | 27 | 101 |
| 3 | 40/260 | 141 | 780 | 25 | 89 |
| 4 | 20/260 | 141 | 800 | 23 | 81 |
| 5 | 30/260 | 170 | 760 | 31 | 121 |

It will be noted that satisfactory cures, as indicated by the physical strength, were obtained in comparatively short periods of time, thus indicating the activating effect of the compounds.

The compounds herein described are thus useful as activators in the acceleration of the vulcanization of rubber and may be employed, as mentioned, with mercaptobenzothiazole or with other accelerators commonly employed in rubber manufacture.

What I claim is:

The cyclohexylamine salt of 2-mercapto-4-phenyl-thio diazole 5-thione.

GEORGE W. WATT.